(12) United States Patent  
Wolber et al.

(10) Patent No.: US 7,946,280 B2
(45) Date of Patent: May 24, 2011

(54) METHOD FOR THE OPERATION OF AN INTERNAL COMBUSTION ENGINE

(75) Inventors: Jens Wolber, Gerlingen (DE); Ruediger Weiss, Moetzingen (DE); Emilie Hincker-Piocelle, Ludwigsburg (DE); Karsten Kroepke, Ludwigsburg (DE); Pierre-Yves Crepin, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 295 days.

(21) Appl. No.: 12/176,792

(22) Filed: Jul. 21, 2008

(65) Prior Publication Data

US 2009/0025695 A1 Jan. 29, 2009

(30) Foreign Application Priority Data

Jul. 27, 2007 (DE) .......................... 10 2007 035 317

(51) Int. Cl.
 *F02B 13/00* (2006.01)
(52) U.S. Cl. .......... 123/575; 123/1 A; 123/434; 123/672
(58) Field of Classification Search .................. 123/1 A, 123/434, 435, 575, 576, 672
See application file for complete search history.

(56) References Cited

U.S. PATENT DOCUMENTS

| 5,121,732 | A | 6/1992 | Benninger et al. | |
| 6,612,269 | B2 * | 9/2003 | Heffel et al. | 123/1 A |
| 6,947,830 | B1 * | 9/2005 | Froloff et al. | 701/111 |
| 2002/0029770 | A1 * | 3/2002 | Heffel et al. | 123/527 |
| 2007/0119415 | A1 * | 5/2007 | Lewis et al. | 123/295 |
| 2007/0215104 | A1 * | 9/2007 | Hahn | 123/339.11 |
| 2009/0281710 | A1 * | 11/2009 | Mallebrein et al. | 701/104 |
| 2010/0071661 | A1 * | 3/2010 | Joos et al. | 123/435 |

FOREIGN PATENT DOCUMENTS

| DE | 41 17 440 | 12/1991 |
| WO | WO 00/65217 | 11/2000 |

* cited by examiner

*Primary Examiner* — John T Kwon
(74) *Attorney, Agent, or Firm* — Merchant & Gould P.C.

(57) ABSTRACT

The invention deals with a method for the operation of an internal combustion engine with at least two cylinders, which can be operated with a fuel of variable quality stored in a tank and/or with fuel blends stored in the tank from a first and at least a second fuel in variable mixing ratios, and wherein variable fuel qualities and/or fuel blends of different compositions require variable air/fuel ratios for the achievement of a stable combustion and/or have a variable vaporization behavior. Provision is, thereby, made for a variation, which is individually adjusted to each cylinder, of the quantity of fuel delivered to the cylinder to be implemented to supply a lean and/or to a rich air/fuel mixture at least one cylinder, for the effect of the variation on the starting characteristics and/or the running smoothness of the cylinder and/or the internal combustion engine to be evaluated and when an improvement in the starting characteristics and/or the running smoothness is achieved, for a fuel adaptation to be implemented for all cylinders. The method makes the quick detection and the avoidance of starting problems possible, when a change in the fuel quality or in the fuel composition occurs with an effect on the ignitability of the fuel.

9 Claims, 1 Drawing Sheet

METHOD FOR THE OPERATION OF AN INTERNAL COMBUSTION ENGINE

TECHNICAL FIELD

The invention deals with a method for the operation of an internal combustion engine with at least two cylinders, which can be operated with a fuel of variable quality stored in a tank and/or with fuel blends from a first and at least a second fuel in variable mixing ratios, and wherein variable fuel qualities and/or fuel blends of different compositions require variable air/fuel ratios for the achievement of a stable combustion and/or have a variable vaporization behavior.

BACKGROUND

When starting internal combustion engines, which are based on the principle of the gasoline engine, the metering of the fuel quantity to be injected plays a decisive role in the ignitability of the air/fuel mixture as well as in the exhaust gas composition. The required fuel quantity depends greatly on the fuel characteristics, especially on the vaporization characteristics of the fuel.

An air/fuel ratio, which is too lean, can, for example, be detected via the evaluation of the engine rotational speed using a start quantity adaptation. Using an afterstart adaptation, the uneven running of the internal combustion engine is evaluated. Immediately following said adaptation, a poor vaporization behavior of the fuel can be compensated for with a mixture enrichment.

Internal combustion engines based on the principle of the gasoline engine are generally operated with fuel from hydrocarbons, which are derived from fossil fuels on the basis of refined crude oil. Alcohol produced from renewable resources (plants), for example ethanol or methanol, is increasingly being added in various mixing ratios to this fuel. In the USA and Europe a mixture of 75-85% ethanol and 15-25% gasoline is often distributed under the trade name E85. The internal combustion engines are designed in such a way that they can be operated with pure gasoline as well as with blends up to E85. This is denoted as a "flex-fuel operation".

As a result of the arbitrary mixture of gas and alcohol, a broad spectrum of variations of the fuel characteristics arises, especially of the fuel stoichiometry and the vaporization behavior.

From the German patent DE 4117440 C2, a method is known for the adaptive adjustment of a fuel/air mixture to take into account the fuel characteristics in the operation of an internal combustion engine, which has a lambda controller, which emits a control factor RF, and which has an adaptation integrator, which emits and adaptation factor AF with variable adaptation speed. Said adaptation factor AF with the control factor RF influences the adjustment of the fuel/air mixture. In so doing, provision is made for a test to determine whether the lambda closed-loop control deviation amplitude exceeds a first threshold value. If this is the case, the adaptation speed is set at an increased value up until a specified condition is met. Thereafter it is shifted back to a lower adaptation speed.

The method makes the trouble-free operation of internal combustion engines possible, which can be operated with variable fuels. Thus, the duration of injection must, for example, be extended by more than 20%, when a change is made from a fuel of pure gasoline to a fuel containing 85% ethanol and 15% gasoline. In so doing, the same lambda values can be maintained in the exhaust gas. According to the method described in the text of the German patent DE 4117440 C2, a corresponding adaptation intervention is additionally performed. Because in comparison to the compensation for the influences of wear and manufacture, a very significant correction of the durations of injection and thereby of the adaptation intervention must be performed when a refueling of the tank takes place, the adaptation speed is significantly increased in the proposed method when a refueling has been detected.

On the basis of the adjusted adaptation value, the fuel mixture ratio can be determined. Despite the increased adaptation time, the method requires a sufficiently long settling time. If a significant change in the fuel mixture ratio is caused by the filling of the tank (fueling), this can lead to starting difficulties and to misfires, which in turn lead to increased exhaust gas emissions.

Beside a change of the fuel mixing ratio of an internal combustion engine operated in the flex-fuel mode, a variation in the fuel quality can also, for example, lead to difficulties in starting in the pure gasoline operating mode. In this instance, the fuel quality especially has an effect on the vaporization characteristics of the fuel. When the alcohol percentage in the fuel is not known, it is difficult to distinguish between the two aforementioned causes. An enrichment of the air/fuel mixture as a reaction to the poor starting performance of the internal combustion engine, as it is known from the pure gasoline operating mode, is for this reason not always appropriate when applied to the flex-fuel mode.

It is the task of the invention to provide a method, which allows for a reliable starting of the internal combustion engine when the fuel mixing ratio is not known or when the fuel quality is not known.

SUMMARY

The task of the invention is thereby solved; in that at least at one cylinder, a variation, which is individually adjusted to each cylinder, of the quantity of fuel delivered to the cylinder is implemented by making the air/fuel mixture leaner or richer; in that the effect of the variation on the starting characteristics and/or on the running smoothness of the cylinder and/or the internal combustion engine is evaluated and in that when an improvement in the starting characteristics and/or in the running smoothness is achieved, a fuel adaptation is implemented for all cylinders. The method makes it possible to implement a comparison of the starting characteristics and/or the running smoothness between the cylinders, which are operated with different operating parameters, and to transfer the best operating parameters for the prevailing fuel to the rest of the cylinders.

In so doing, the change in the characteristics of the fuel can be suggested when comparing the original operating parameters with the new operating parameters. For example, an inference can be made whether a fuel with a more significant vaporization prevails or if the mixing ratio of a prevailing fuel mixture has changed. By means of its quick implementability already during the starting phase, the method first of all allows for a reliable starting of the internal combustion engine. It furthermore prevents that the internal combustion engine quits in the phase after the starting procedure. If need be, a more exact adaptation of the fuel characteristics can take place via known methods in the subsequent operational mode of the internal combustion engine.

A variation, which is individually adjusted to each cylinder, of the quantity of fuel delivered to the cylinder can be implemented at one or several cylinders in comparison to the existing settings, with which one or several additional cylinders are being operated. Moreover, it is possible to change the injected fuel quantity at different cylinders in the opposite direction in order to establish a suitable direction of adaptation.

If provision is made for the variation, which is individually adjusted to each cylinder, of the quantity of fuel delivered to the cylinder to be implemented during starting of the internal combustion engine and/or in a post starting phase, a reliable starting of the engine as well as a reliable operational mode of the engine is assured until a more exact fuel adaptation by the engine management system has been implemented.

If provision is additionally made for the variation, which is individually adjusted to each cylinder, of the quantity of fuel delivered to the cylinder to be implemented after a detected filling of the tank (fueling) and/or when a fuel adaptation has not yet been implemented and/or when starting difficulties of the internal combustion engine occur and/or when an uneven running of the internal combustion engine is detected after starting, a manipulation of the operating parameters of the internal combustion engine is then only performed if a change in the fuel characteristics can be assumed. A distinct change in the fuel characteristics generally assumes that a filling of the tank (fueling) has taken place. Fuel with the new fuel characteristics will arrive at the internal combustion engine from the tank after a certain time of flow. This can occur during the normal operation of the internal combustion engine as well as during a starting phase or in a phase immediately after starting the internal combustion engine. In this instance, a more rapid compensation for the altered fuel characteristics can take place by means of the method according to the invention. If a fuel adaptation has already taken place since the tank was filled, the fuel characteristics are thus adequately known, for example the composition of a fuel blend, in order to guarantee a reliable starting and operation of the internal combustion engine. If starting difficulties or an uneven running of the internal combustion engine nevertheless occur, an unknown reason for the change in the fuel characteristics can thus be assumed. For example, a filling of the tank (fueling) can have gone undetected.

A simple and reliable detection of starting problems of the internal combustion engine is thereby possible with existing sensors and sensor data, so that an evaluation of the starting characteristics is implemented using the rotational speed progression of the internal combustion engine in the starting phase. The engine rotational speed, respectively the engine rotational speed progression, can thereby be compared with specified values or value ranges.

The declaration reliability of the method can thereby be influenced, in that the variation, which is individually adjusted to each cylinder, of the quantity of fuel delivered to the cylinder is implemented during a combustion stroke or during several combustion strokes. Especially if a well-founded suspicion of a too lean or a too rich air/fuel mixture exists, it is advantageous if one or several of the cylinders of the internal combustion engine are repeatedly operated in a rich state, respectively lean state.

According to an especially preferred variation of embodiment of the invention, provision can be made for a filling of the tank (fueling) and the fill level of the tank and the mixing ratio between the first and the second fuel existing in the tank before the filling of the tank (fueling) to be ascertained, for a quantity of fuel added to the tank during fueling to be ascertained, for a filling of the tank (fueling) with a fuel blend, which was added in an accepted mixing ratio between the first and the second fuel, to be assumed when a detected filling of the tank (fueling) has occurred, for a mixing ratio in the tank to be calculated, which can be assumed to have resulted from said filling of the tank (fueling) and for the variation, which is individually adjusted to each cylinder, of the quantity of the fuel delivered to the cylinder to take place to the effect that an air/fuel mixture exists suited to the mixing ratio, which can be assumed to have resulted from said filling of the tank (fueling). A possible change in the fuel mixture ratio and consequently in the fuel characteristics can be suggested from the detected filling of the tank (fueling). The mixing ratio existing in the tank before the filling of the tank (fueling) is known, for example, from a fuel adaptation implemented during the operation of the internal combustion engine. If the quantity of fuel added is additionally known, an assumed fuel composition in the tank resulting from said filling of the tank (fueling) can be calculated for an assumed composition of the added fuel. From the deviation of this assumed fuel composition, which resulted from said filling of the tank (fueling), from the fuel composition before the filling of the tank (fueling), a necessary change in the quantity of fuel delivered to the cylinder can be determined. In a subsequent evaluation of the starting characteristics, respectively the running smoothness in an afterstart phase, it can be determined whether the change in the quantity of fuel delivered, which is adjusted individually to each cylinder, took place in the right direction, for example toward a richer air/fuel mixture. If this is the case, the quantity of fuel delivered can likewise be correspondingly changed for the other cylinders.

If provision is thereby made for the assumed mixing ratio of the fuel added to the tank to correspond to a fuel blend from at least approximately equal percentages of the first fuel and the second fuel and/or for the assumed mixing ratio of the fuel added to the tank to consist of a fuel blend from at least approximately equal percentages of a first fuel and a specified blend from the first and second fuel, fuel characteristics for the assumed fuel blend added to the tank thus arise, which lie approximately in the middle of the possible fuels added to the tank. Therefore, in Europe it is only possible to fuel the tank either with pure gasoline E0 or with E85, i.e. a specified blend consisting of 85% ethanol and 15% gasoline. The method lends itself then to be advantageously implemented with an assumed mixing ratio of E40 of the fuel added to the tank, which corresponds to a blend of approximately equal percentages of E0 and E85.

The method advantageously lends itself to be used for the adaptation of the operating parameters of an internal combustion engine to the composition of a gasoline/ethanol fuel blend and/or a gasoline/methanol fuel blend and/or a diesel/biodiesel fuel blend.

In addition the method advantageously lends itself to be used for the adaptation of the operating parameters of the internal combustion engine to a prevailing gasoline quality.

BRIEF DESCRIPTION OF THE DRAWINGS

The invention is explained below in detail using one of the examples of embodiment depicted in the FIGURE. The following is shown.

DETAILED DESCRIPTION

Figure 1:
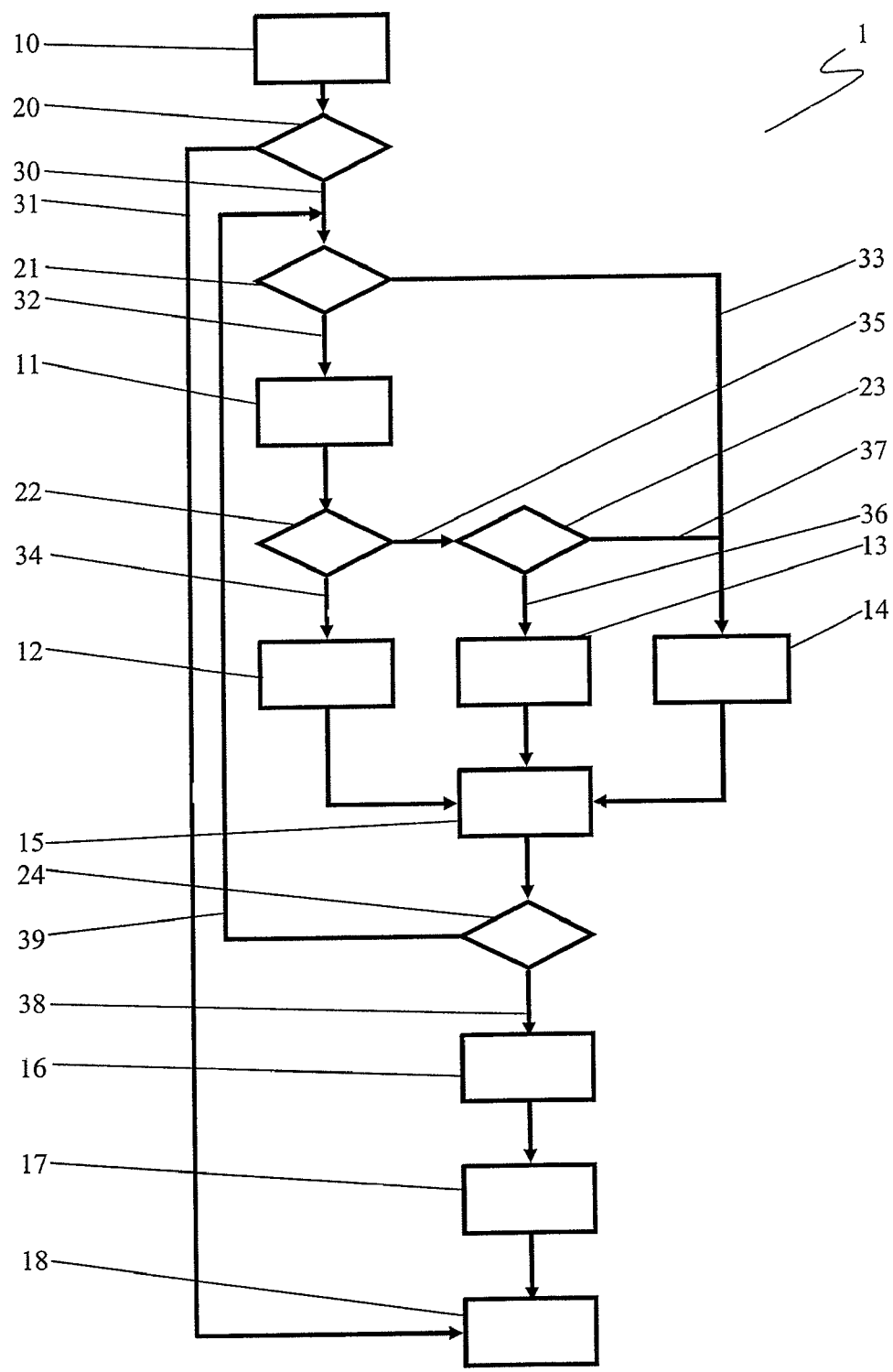
FIG. 1 is a flow diagram for the fuel adaptation in the starting phase of an internal combustion engine.

FIG. 1 shows a flow diagram 1 for the fuel adaptation in the starting phase of an internal combustion engine, which can be operated with gasoline or a blend of gasoline and ethanol.

A first block: start internal combustion engine 10 is followed by a junction: poor engine rotational speed progression 20 with the branches: yes, poor engine rotational speed progression 30 and: no, poor engine rotational speed progression 31. The branch: yes, poor engine rotational speed progression 30 leads to a further junction: filling of the tank (fueling) detected 21, which leads with the branch: yes, filling of the tank (fueling) detected 32 to a block: presumption fuel E40 11, while a branch: no, filling of the tank (fueling) detected 33 leads to a block: lean out/richen 14. A junction: ethanol content >60% 22 is subsequent to the block: presumption fuel E40 11. Said junction leads with a branch: yes, ethanol content >60% 34 to a block: lean out individual cylinders 12 and with a branch: no, ethanol content >60% 35 to a further junction: ethanol content <20% 23. A branch: yes, ethanol content <20% 36, which starts from this junction, leads to a block: richen individual cylinders 13; and a branch: no ethanol content <20% 37, which starts from said junction proceeds together with the branch: no, filling of the tank (fueling) detected 33 to the block: lean out/richen 14. The blocks: lean out individual cylinders 12, richen individual cylinders 13 and lean out/richen 14 are connected to a block: evaluate engine rotational speed 15, which in turn leads to a junction: improvement in engine rotational speed progression 24. A branch: no, improvement in engine rotational speed progression 39 leads back again to the front end of the junction: filling of the tank (fueling) detected 21. A branch: yes, improvement in engine rotational speed progression 38 leads on the other hand to a block: adoption of operating parameters 16, and proceeds from there to a block: storage 17 and finally to a block: end 18, which is also fed by the branch: no, poor engine rotational speed progression 31.

The starting of the internal combustion engine takes place in the block: start internal combustion engine 10. At the junction: poor engine rotational speed progression 20, a test is made using the progression of the rotational speed during the start-up of the internal combustion engine and using the running smoothness of the internal combustion engine in the phase immediately after the starting of the internal combustion engine to determine whether starting problems or afterstart problems exist. If no such starting problems, respectively afterstart problems, exist, the flow diagram jumps over the branch: no, poor engine rotational speed progression 31 to the block: end 18 without performing a change in the operating parameters of the internal combustion engine or of individual cylinders of the internal combustion engine. If on the other hand starting problems, respectively afterstart problems are detected, the flow diagram proceeds via the branch: yes, poor engine rotational speed progression 30 to the junction: filling of the tank (fueling) detected 21. A test is made here to determine whether a filling of the tank (fueling) was detected and/or whether a fuel adaptation has not yet taken place or has not yet been completed. If none of these conditions are met, the cause for the starting problems is not clear. In this case, a branching out occurs via the branch: no, filling of the tank (fueling) detected 33 to the block lean out/richen 14. If on the other hand a filling of the tank (fueling) is detected without a corresponding fuel adaptation having been implemented, the flow diagram follows the branch: yes, filling of the tank (fueling) detected 32 to the block: presumption fuel E40 11. A presumption occurs in this block that the fuel added to the tank has a mixing ratio of 40% ethanol and 60% gasoline. A fuel blend with this mixing ratio is denoted as E40. The mixing ratio E40 lies in the middle of the major fuels in Europe and the USA: pure gasoline E0 and ethanol/gasoline E85 with a mixing ratio 85% ethanol and 15% gasoline. Under this presumption, the flow diagram leads to a junction: ethanol content >60% 22.

At this junction, a test is made to determine whether the ethanol content of the fuel blend in the tank was greater than 60% before filling the tank (fueling). The ethanol content before filling the tank (fueling) was ascertained, for example, in the process of the normal engine operation by means of a fuel adaptation with the aid of a lambda probe. If an ethanol content >60% existed, the flow diagram follows the branch: yes, ethanol content >60% 34 to the block: lean out individual cylinders 12. If an ethanol content of the fuel blend before filling the tank (fueling), which is over 60%, is deposited, a blend of E40 is assumed to have been added to the tank; so that the assumed mixing ratio in the tank, which has resulted after the filling of tank (fueling), has an ethanol content, which is smaller than 60%. Consequently provision should be made for a smaller quantity of fuel to be metered to the internal combustion engine in comparison to the E60 blend. This leads to the decision to operate one or several cylinders with a leaned-out air/fuel mixture and to check this measure in the subsequent block: evaluate engine rotational speed 15 and at the junction: improvement in engine rotational speed progression 24.

This sequence in the flow diagram according to the invention is clearly pointed out below in the concrete numerical example. The example assumes that a fuel blend of E80 is present in the tank before filling (fueling) and that a fuel of E0, i.e. pure gasoline, is added. As a result, a quantitative ratio of 20% E80 to 80% E0 prevails in the tank, which leads to a fuel blend of E16. After the filling of the tank (fueling), the internal combustion engine is started and then turned off exactly when the new fuel mixture has arrived in a rail of the internal combustion engine. When restarting the internal combustion engine, the ethanol content is therefore not known. The start-up with the operating parameters for an E80 blend leads to starting problems. According to the sequence in the flow diagram, it is assumed in a first presumption after a detected filling of the tank (fueling) that a blend of E40 was added to the tank, which lies in the middle of the possible range of E0 to E85. A new blend of E48, i.e. a transition from a previous E80 to E48, is therefore assumed. This does not correspond to the actual composition of E16; however, relative to the original blend of E80, the direction of the assumed change is correct. If, therefore, on the basis of the assumptions made, one or several cylinders is operated with a smaller fuel percentage, this then leads to improved starting and to a greater running smoothness in the afterstart phase, which can be proved by way of an evaluation of the engine rotational speed progression in each individual cylinder.

If it is determined at the junction: ethanol content >60% 22 that the ethanol content was smaller than 60% before the filling of the tank (fueling), the procedure proceeds via the branch: no, ethanol content >60% 35 to a test at a further junction: ethanol content <20% 23 to determine whether the original ethanol content was less than 20%. If this is the case, the sequence proceeds via the junction: yes, ethanol content <20% 36 to the block: richen individual cylinders 13. Because under the presumption that a blend of E40 was added to the tank, the assumed mixing ratio after the filling of the tank (fueling) has a higher ethanol content than the blend before the filling of the tank (fueling); a leaning-out of the air/fuel mixture of the individual cylinders is performed in the block: richen individual cylinders 13 as a measure for the improvement in the starting characteristics. This measure is in turn checked in the subsequent block: evaluate engine rotational speed 15 and at the junction: improvement in engine rotational speed progression 24.

The sequence in the flow diagram according to the invention is clearly pointed out for this situation using a numerical example: The example assumes that a fuel of E0 was present in the tank before a filling of the tank (fueling) and that a fuel blend of E20 was added. In so doing, a quantitative ratio of 20% E0 to 80% E20 prevails, which leads to a fuel blend of E16. After the filling of the tank, the internal combustion engine is started and then turned off exactly when the new fuel mixture has arrived in the rail of the internal combustion engine. When restarting the internal combustion engine, the ethanol content is therefore not known. The start-up with the operating parameters for an B0 fuel leads to starting problems. According to the sequence in the flow diagram, it is assumed in a first presumption after a detected filling of the tank (fueling) that a blend of E40 was added to the tank, which lies in the middle of the possible range of E0 to E85. A new blend of E32, i.e. a transition from a previous E0 to E32, is therefore assumed. This does not correspond to the actual composition of E16; however, relative to the original fuel E0, the direction of the assumed change is correct. If, therefore, on the basis of the assumptions made, one or several cylinders is operated with a higher fuel percentage, this then leads to improved starting and to a greater running smoothness in the afterstart phase, which can be proved by way of an evaluation of the engine rotational speed progression, which is adjusted to each individual cylinder.

If it is determined at the junction: ethanol content <20% 23, which is juxtaposed to the junction: ethanol content >60% 22, that the ethanol percentage before the filling of the tank (fueling) was not smaller than 20%, the ethanol content before the filling of the tank (fueling) then lies in the range between 20% and 60%. Under a presumption of an added fuel blend of E40, the cause for the starting problems is then not known; the branch: no, ethanol content <20% 37 leads the sequence in the flow diagram to the block: lean out/richen 14. If the cause for the starting problems is not known, no recommendation for a leaning-out or richening of individual cylinders can be specified. In the block: lean out/richen 14, some of the cylinders are, thus, operated with a richer air/fuel mixture; while other cylinders are supplied with a leaner air/fuel mixture. The one of the two measures, which leads to a better starting performance, respectively to a greater running smoothness in the afterstart phase, is tested in the subsequent block: evaluate engine rotational speed 15 and at the junction: improvement in engine rotational speed progression 24.

It is assumed according to a concrete numerical example for this sequential pathway that a fuel blend of E40 was present in the tank prior to the filling of the tank (fueling) and that a fuel blend of E80 was added. The quantitative ratio amounts to 50% E40 and 50% E80, which leads to a blend of E60. Also in this instance, the internal combustion engine is started after the filling of the tank (fueling) and then turned off exactly when the new fuel mixture arrives in the rail of the internal combustion engine. When restarting the internal combustion engine, the ethanol content is therefore not known. According to the sequence in the flow diagram, it is assumed in a first presumption that a blend of E40 was added to the tank. Therefore, a new blend of E40, i.e. no change, is assumed. Actually the fuel composition in the tank changes from E40 to E60. For this reason, a tendency cannot be derived from the assumption made with regard to the direction a quantity of fuel delivered to a cylinder should be changed. Starting problems can arise when starting the internal combustion engine with the operating parameters for a blend of E40. Because it is not known whether the blend is too rich or too lean, some cylinders are richened, while others, on the other hand, are leaned out. In a subsequent evaluation of the engine rotational speed, which is individually adjusted to each cylinder, an assessment can be made about which of the measures led to an improvement in the starting characteristics.

In the block: evaluate engine rotational speed 15, the progression of the engine rotational speed for the individual cylinders is evaluated. In the subsequent branch: improvement in the engine rotational speed progression 24, a test is made to determine whether the measures taken have led to an improvement in the starting performance of the internal combustion engine. If this is not the case, the sequence of the flow diagram is led back via the branch: no, improvement in the engine rotational speed progression 39 to the junction: filling of the tank (fueling) detected 21, and the procedure is again run through. If, on the other hand, an improvement in the engine rotational speed is established, the procedure is thus led via the branch: yes, improvement in the engine rotational speed progression 38 to the block: adoption of operating parameters 16. In this block, the measures, which led to an improvement in the starting and/or running characteristics of the internal combustion engine during the variation of the operating parameters (especially of the quantity of fuel delivered), which is adjusted to each individual cylinder, are transferred to all other cylinders. In an optional following block: storage, the newly ascertained values can, for example, be stored as special richening, respectively special leaning-out. After the improvement in the starting characteristics of the internal combustion engine, which have been achieved in this manner, the sequence in the flow diagram is concluded in the subsequent block: end 18.

The invention claimed is:

1. A method of operating an internal combustion engine having at least two cylinders capable of operating with any-one of a fuel of variable quality stored in a tank or with and a fuel blend stored in the tank, wherein the fuel blend is mixed in a variable ratio from a first and at least a second fuel, and wherein the fuel of variable qualities and the fuel blends of different compositions either require a variable air/fuel ratio for the achievement of a stable combustion or have a variable vaporization behavior, the method comprising:
 varying a quantity of fuel delivered to the at least two cylinders in at least one of the cylinders to supply one of a lean and a rich air/fuel mixture, wherein the fuel quantity variation is individually adjusted to each of the at least two cylinders;
 evaluating the effect of the fuel quantity variation on at least one of a starting characteristic and a running smoothness of any one of each of the at least two cylinders and the internal combustion engine; and
 implementing a fuel adaptation for all cylinders based on the fuel quantity variation achieving an improvement in at least one of the starting characteristic and the running smoothness.

2. A method according to claim 1, further comprising individually varying the quantity of fuel delivered to the at least two cylinders in at least one of the cylinders when the internal combustion engine is started or in an afterstart phase.

3. A method according to claim 1, further comprising individually varying the quantity of fuel delivered to the at least two cylinders in at least one of the cylinders if one or more of the following conditions are satisfied:
 a. after a detected filling of the tank;
 b. the fuel adaptation has not yet been implemented;
 c. the internal combustion engine experiences a starting problem; or
 d. an uneven running of the internal combustion engine is detected.

4. A method according to claim 1, further comprising implementing the evaluation of the starting characteristic using a rotational speed progression of the internal combustion engine during a starting phase.

5. A method according to claim 1, further comprising implementing the individual variation of the quantity of fuel delivered to the at least two cylinders in at least one of the cylinders during one or more combustion strokes.

6. A method according to claim 1, further comprising:
ascertaining a filling of the tank, a fill level of the tank and a mixing ratio prevailing in the tank between the first and the second fuel prior to the filling of the tank;
ascertaining a quantity of fuel added to the tank;
when a filling of the tank is detected, assuming that the tank is filled with a fuel blend having an assumed mixing ratio between the first and the second fuel;
calculating an assumed mixing ratio prevailing in the tank resulting from said filling of the tank, wherein the step of individually varying the quantity of fuel delivered to the at least two cylinders in at least one of the cylinders is made such that there is a suitable air/fuel mixture for the assumed mixing ratio prevailing in the tank.

7. A method according to claim 6, wherein the assumed mixing ratio added to the tank corresponds to one of a fuel blend from at least approximately equal percentages of the first fuel and the second fuel and a fuel blend from at least approximately equal percentages of a first fuel and a specified blend from the first and the second fuel.

8. A method according to claim 1, wherein the fuel adaptation is an adaptation of one or more operating parameters of the internal combustion engine to a composition of one or more of the following fuel blends:
 a. gasoline/ethanol;
 b. gasoline/methanol;
 c. gasoline/ethanol/methanol; and
 d. diesel/biodiesel fuel blend.

9. A method according to claim 1, wherein the fuel adaptation is an adaptation of one or more operating parameters of the internal combustion engine to a gasoline quality prevailing in the tank.

* * * * *

UNITED STATES PATENT AND TRADEMARK OFFICE
CERTIFICATE OF CORRECTION

| | | |
|---|---|---|
| PATENT NO. | : 7,946,280 B2 | |
| APPLICATION NO. | : 12/176792 | |
| DATED | : May 24, 2011 | |
| INVENTOR(S) | : Wolber et al. | |

It is certified that error appears in the above-identified patent and that said Letters Patent is hereby corrected as shown below:

Col. 7, line 8: "for an BO fuel leads" should read --for an E0 fuel leads--

Col. 8, line 30, claim 1: "in a tank or with and a" should read --in a tank and a--

Signed and Sealed this
Third Day of January, 2012

David J. Kappos
*Director of the United States Patent and Trademark Office*